United States Patent [19]

Fudala

[11] Patent Number: 4,521,055
[45] Date of Patent: Jun. 4, 1985

[54] POWER RECLINER

[75] Inventor: Chester S. Fudala, Troy, Mich.

[73] Assignee: Ferro Manufacturing Corporation, Southfield, Mich.

[21] Appl. No.: 412,584

[22] Filed: Aug. 30, 1982

[51] Int. Cl.³ .............................................. B60N 1/06
[52] U.S. Cl. ..................................... 297/362; 74/788; 297/330
[58] Field of Search ............... 297/362, 330, 366, 367; 74/797, 788

[56] References Cited

U.S. PATENT DOCUMENTS

| 1,668,709 | 5/1928 | Buehler | 74/797 |
| 2,492,041 | 12/1949 | Heise | 74/801 |
| 4,167,834 | 9/1979 | Pickles | 49/358 |
| 4,195,881 | 4/1980 | Klüting et al. | 297/362 X |
| 4,314,729 | 2/1982 | Klueting | 297/366 |

FOREIGN PATENT DOCUMENTS

| 2321184 | 11/1974 | Fed. Rep. of Germany | 297/362 |
| 2822135 | 11/1979 | Fed. Rep. of Germany | 297/362 |
| 2931894 | 2/1981 | Fed. Rep. of Germany | 297/362 |
| 119249 | 9/1980 | Japan | 74/788 |
| 126184 | 9/1980 | Japan | 74/797 |

*Primary Examiner*—Victor N. Sakran
*Assistant Examiner*—Peter R. Brown
*Attorney, Agent, or Firm*—Barnes, Kisselle, Raisch, Choate, Whittemore & Hulbert

[57] ABSTRACT

A power seat recliner, comprising a transmission housing, a motor rigidly fixed directly to and supported by the transmission housing and having an output shaft extending directly into said housing, a seat back mounting pivoted to said housing and including an arm having a sector gear thereon, transmission gearing in said housing, and resilient drive means connecting the motor output shaft to said gearing. The motor axis is located such as to position the worm on its output shaft at a space-conserving location within the transmission housing.

6 Claims, 9 Drawing Figures

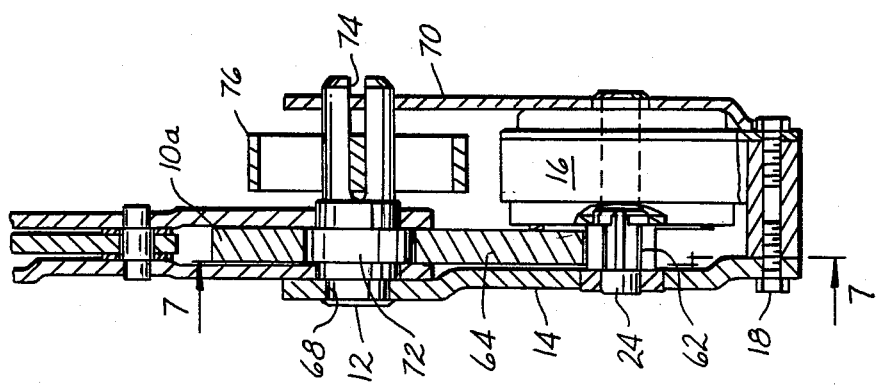
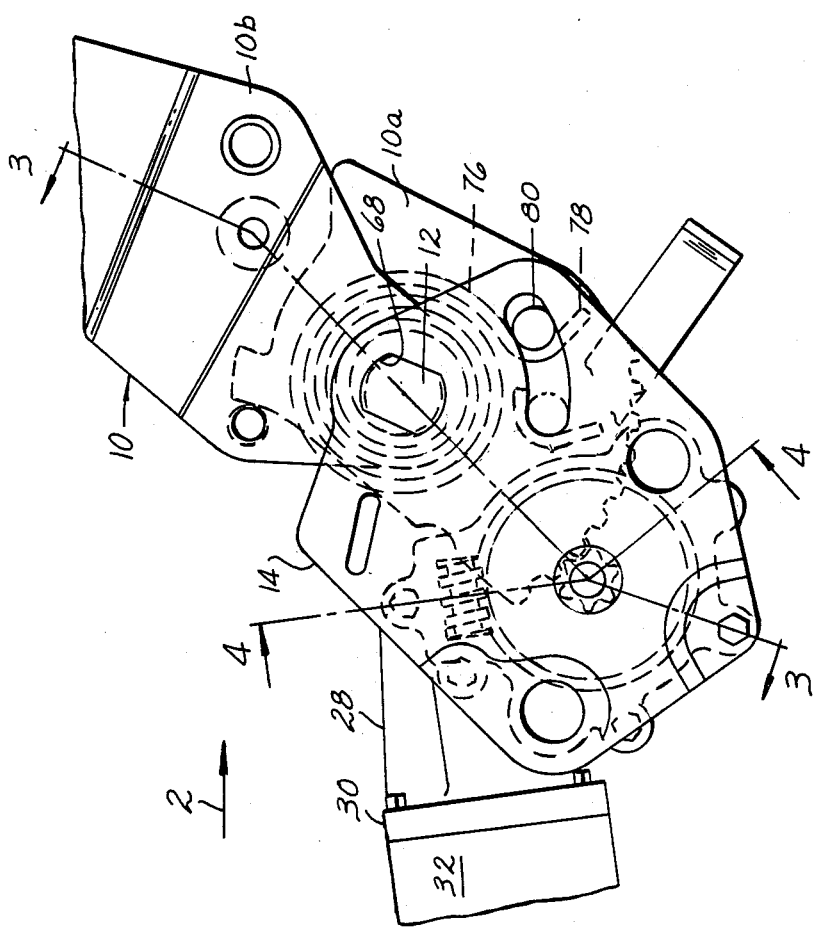
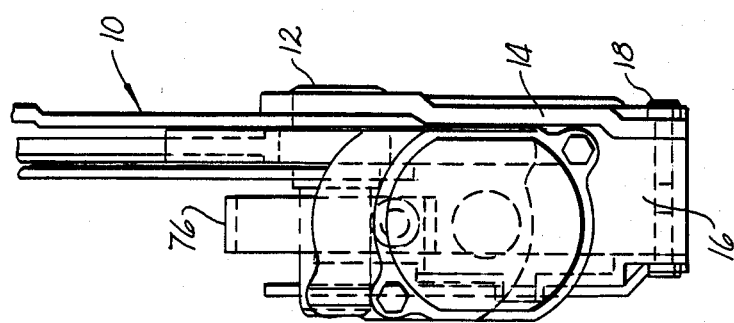

POWER RECLINER

BRIEF SUMMARY OF THE INVENTION

The present invention relates to vehicle seats, such as individual seats in automobiles, in which the seat back is adjustable to tilt rearwardly from a nominally upright to a rearwardly inclined position. Such seats are known as reclining seats and the seat back may be tilted rearward to and retained at any desired inclination.

Reclining seat backs may be physically adjusted by the occupant of the seat by releasing latching or locking mechanism and simply leaning back to displace the seat back to a desired position, at which time the latch or lock is re-engaged. Usually biasing spring means are provided, effective to adjust the seat back forwardly when unlocked and such movement is unopposed by the occupant.

The present invention however, relates to a reclining seat back which is power adjusted both forwardly and rearwardly. The power source is a reversible electric motor, which drives the seat back through a train of gears contained in a transmission housing fixed to a seat mount or bracket. The gear train includes a worm-worm gear reduction and a planetary reduction. The motor is mounted directly on the transmission housing and has an output shaft extending into the housing.

A seat back mounting or bracket is pivoted directly to the seat bracket, and includes an arm provided with a toothed sector which meshes exterior of the housing to the final gear of the train connecting the motor to the seat back.

This permits a compact unitary structure made up of the two hinged brackets, the motor and the transmission housing. Moreover, by providing the motor shaft axis at a particular location with respect to the transmission, the entire structure can be very compact and shaped to be received in the usually constricted space available.

This compact arrangement is made possible by including in the gearing a torque transmitting device including yieldable springs which absorb abrupt shock and impacts when the motor is energized.

Resilient torque transmitting devices of this type have been used in a different combination, such for example as shown in assignee's prior U.S. Pat. Nos. 3,455,418 (parking brake), 3,478,182 (torque responsive switch), 3,627,377 (top lift for convertible vehicles), and 4,167,834 (power window). However, such a unit is uniquely useful in the combination disclosed herein, due to the fact that it permits the combination of the brackets, the motor, and the transmission housing as a single effectively unitary construction which connects the pivoted seat back bracket to the relatively fixed seat bracket and provides for power actuation to incline the pivoted bracket in either direction and to retain in adjusted position.

The transmission gearing comprises a worm preferably formed as a part of the motor output shaft, and a worm gear in mesh with the worm and having a resilient driving connection with a spider angularly movable about the axis of the worm gear. The spider is connected to a small sun gear rotatable on the transmission output shaft. The transmission housing is formed to provide an internal gear, and a plurality of planet gears are mounted on a rotatable carrier and interposed between the sun gear and the fixed internal gear. The carrier is connected to the transmission output shaft which extends through the housing and has a pinion exterior of the housing which meshes with the toothed sector formed as a part of the pivoted seat back bracket.

BRIEF DESCRIPTION OF THE DRAWINGS

FIG. 1 is a side elevation of the seat recliner.
FIG. 2 is an elevation as seen from the left of FIG. 1.
FIG. 3 is a sectional view on the line 3—3, FIG. 1.

DETAILED DESCRIPTION

Figure 6:
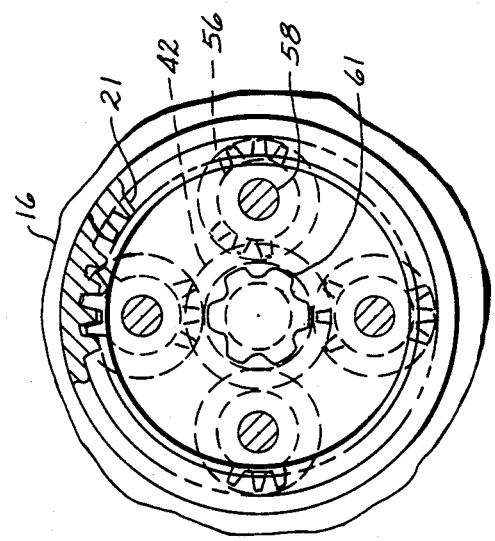
FIG. 6 is a detail elevational view on the line 6—6, FIG. 4.

Referring now to the drawings, a seat back mount indicated generally at 10, is composed of two separately pivoted elements 10a and 10b, which are specially formed to provide an inertia lock forming no part of the present invention. The seat back mount is pivoted to a main pivot pin 12 which is fixedly carried by a rigid seat mount 14, and constitutes the pivot support for the entire seat back. Seat back mount element 10a includes a toothed sector, by means of which it is adjusted.

Figure 4:
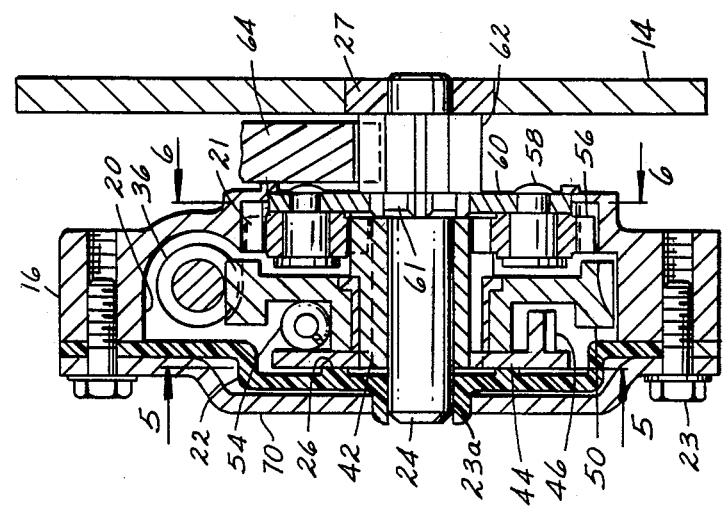
FIG. 4 is an enlarged sectional view on the line 4—4, FIG. 1.

A transmission housing 16, best seen in FIGS. 3 and 4, may be a zinc casting, and is fixed to the seat mount 14 by screws 18. The transmission housing is formed to provide cavities in which the transmission gearing is mounted. A first cavity receives a worm and worm gear, later to be described, and a second- cavity is formed with internal gear teeth 21 forming a part of a planetary gear set as will later be described. The cavity 20 is closed by a transmission cover 22 which is secured to the transmission housing 16 by screws 23. Transmission cover 22 has a journal portion 23a which receives rotatable pinion drive shaft 24, and is provided with a low annular bearing 26 engageable with a rotary element of the transmission, as will later be described. For this the cover 22 is formed of a low friction structural plastic such as Delrin.

A reduced end of shaft 24 is received in a bearing 27 pressed into a matching opening in the seat mount 14. Conveniently, the outer diameter of the bearing may be serrated to have an interference fit with the opening in which it is received.

Figure 8:
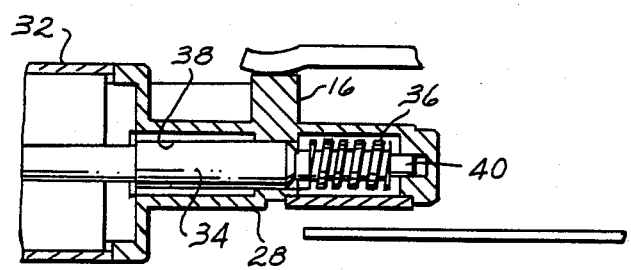
FIG. 8 is a fragmentary sectional view on the line 8—8, FIG. 7.

The transmission housing is provided with a motor mount 28 which includes a mounting flange 30 to mount the motor 32 directly on the transmission housing. The motor has a unitary output shaft 34, best seen in FIG. 8, and preferably this shaft is provided with an integrally formed worm 36 adjacent its outer end. The shaft 34 is journalled in a bearing 38 in the motor mount 28, and the reduced end 40 of the worm shaft is journalled in a recess provided in the transmission housing 16. Yieldable cushion means indicated generally at 41 in FIG. 5 is provided in the transmission as will now be described.

Figure 5:
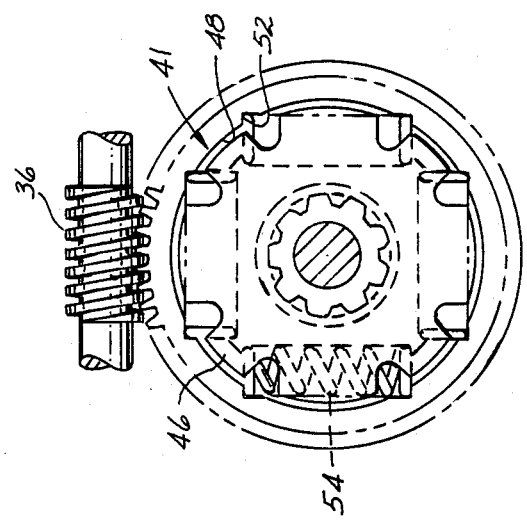
FIG. 5 is a detail elevational view on the line 5—5, FIG. 4.

The sun-gear 42 is rotatable on shaft 24 and is splined to a spider 44 having arms 46 extending into an annular slot 48 formed in a worm gear 50 as best seen in FIG. 5. The annular slot is provided with four enlargements 52 which are disposed to receive compression springs 54.

In the position seen in this figure, it will be noted that the ends of the springs seat on the ends of the slot enlargements 52 in position to be engaged by the edges of arms 46 upon relative angular movement between worm gear 50 and the spider 44. The springs 54 are prestressed to oppose such angular movement but yield to transmit torque of the required amount to operate the seat back in either direction.

The resilient torque transmitting device or cushion as just described is not new, as noted above. However, in the present combination it contributes to the over-all improved recliner, particularly in the compact arrangement which can be received in its entirety in the restricted space available. It is thus possible to eliminate flexible drive cables between the motor and adjusting device, by mounting the motor directly on the transmission housing and at the same time cushion the abrupt movement of the seat back on energization of motor 32 which would otherwise result. In addition, the use of the resilient torque transmitting device provides for further space economy as best seen in FIG. 4. Here it will be seen that the worm gear is directly engaged at its periphery by the worm 36, while the resilient torque transmitting structure or cushion is largely located within the overall dimensions of the worm gear.

Spider 44 is splined to the rotatable sun gear 42 as before described and at its right hand end (as seen in FIG. 4) the sun gear is provided with teeth which mesh with planet pinions 56, here shown as four in number. Pinions are carried by pins 58 on a carrier plate 60 which in turn is splined to the pinion drive shaft 24 as indicated at 61. Beyond the spline connection, shaft 24 has the drive pinion 62 formed thereon. Pinion 62 meshes with the gear teeth of sector portion 64 of seat back mount 10a.

Figure 7:
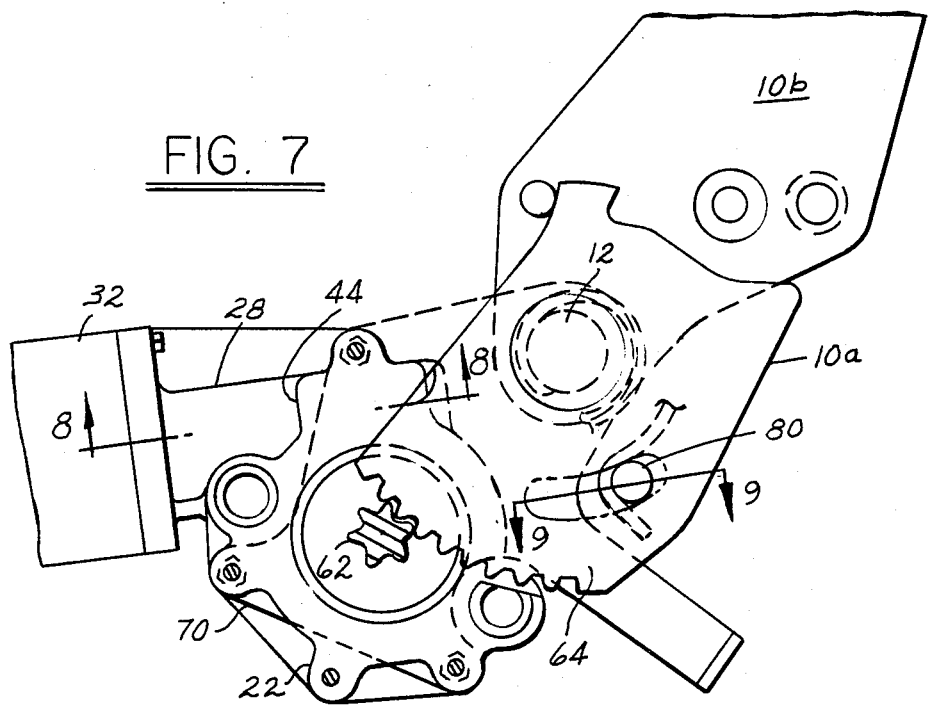
FIG. 7 is a detail elevational view on the line 7—7, FIG. 3.
Figure 9:
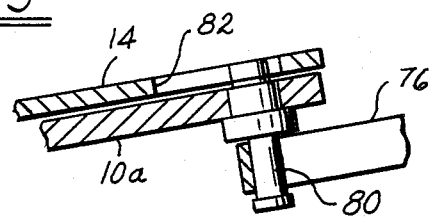
FIG. 9 is fragmentary sectional view on the line 9—9, FIG. 7.

Referring now more particularly to FIGS. 3 and 7, the pivot stud 12 is mounted by riveting at one end in a non-circular opening 68 in the relatively stationary seat mount, and its opposite end is supported in tie plate 70 which is rigidly fixed to the transmission by fasteners, one of which is seen at 18. The stud 12 is thus rigidly mounted against rotation, and provides a pivot mounting at 72 for the seat back mount 10a.

Stud 12 is slotted at 74 and receives one end of a spiral counter balance spring 76. Spring 76 is prestressed to counter balance the seat back, and its movable outer end has a hook shaped portion 78 engaging a pin 80 carried by seat back mount 10a and projecting through an arcuate slot 82 provided in seat mount 14.

It will be understood that when motor 32 is not energized the worm-worm gear component of the transmission is locked against forces originating at the seat back, although the springs 54 in the coupling between the worm gear and spider provide a cushion effect. With the seat back in any position between its erect position and its full reclining position, energization of the motor in the selected direction drives the worm 36 which in turn drives the worm gear 50. Worm gear 50 is resiliently coupled to spider 44 through springs 54 and arms 46. Springs 54 are prestressed to yield a pre-determined amount so as to avoid abrupt initial movement of the seat back and to enable the motor to assume full load. Spider 44 rotates sun gear 42 which is in mesh with planet pinions 56 which in turn are in mesh with the stationary internal or ring gear having the teeth 21 formed in the transmission housing 16. Pinions 56 are thus caused to revolve around the ring gear and drive the planet gear carrier 60 at an overall reduction as determined by the worm-worm gear component and the planetary component.

From the foregoing, it will be noted that the construction comprising the hinge structure, the motor, and the counter-balance spring occupies a minimum of space measured in the direction parallel to the axes of the stud and shaft. This is enhanced by the provision of the worm gear with the annular recess at one side thereof receiving the cushioning springs and the spider arms. The spider plate substantially closes this recess, and is retained in position by the housing cover functioning as a friction reducing bearing for the spider.

Both the stud which pivotally supports the pivoted bracket, and the transmission shaft are supported at opposite ends between the fixed bracket and the tie plate, thus ensuring smooth operation of the drive pinion and sector gear.

I claim:

1. A power recliner for the seat back of a vehicle seat comprising, a relatively fixed substantially flat plate providing a seat mount, a substantially flat tie plate parallel to and spaced from said seat mount to define an enclosure therebetween, a hollow transmission housing in the form of a metal casting having openings at opposite sides and fixedly mounted between said seat mount and tie plate, said housing having an integral motor support extending laterally therefrom out of said enclosure, said motor support having an opening therethrough communicating with the interior of said housing, a first one of said openings at one side of said housing being provided with internal gear teeth to form a ring gear, a reversible electric motor mounted directly on the motor support of said housing, said motor having an output shaft extending through the opening in said motor support into the interior of said housing, said motor output shaft having a coaxial worm at its inner end, a cover plate formed of a low friction plastic material fixed to said housing and covering the other opening at the other side of said housing, a rotary transmission drive shaft journalled at one end in an opening in said cover plate and at the other end in an opening in said seat mount, a carrier plate fixed to said drive shaft and journalled in said first opening at the said one side of said housing axially outwardly of the teeth therein, a worm gear rotatable on said drive shaft within said housing and in mesh with said worm, a sun gear mounted on and rotatable with respect to said drive shaft in the plane of said ring gear, resilient means yieldably coupling said worm gear to said sun gear, a plurality of planet gears on said carrier plate in mesh with said sun gear and said ring gear, a drive pinion fixed to said drive shaft exterior of said housing but within the enclosure between said seat mount and tie plate, a pivot pin extending between said seat mount and said tie plate, and a seat back mount pivotally carried by said pivot pin and having a toothed sector in mesh with said drive pinion.

2. A recliner as defined in claim 1, in which said worm is formed directly on said motor output shaft.

3. A recliner as defined in claim 2, in which the outer end of said motor output shaft is journalled directly in an opening formed at the interior of said housing.

4. A recliner as defined in claim 1, in which said tie plate has an enlarged journal opening in alignment with said drive shaft, and in which said cover plate has an integral short tubular journal portion received in said journal opening and receiving one end of said drive shaft.

5. A recliner as defined in claim 4, and a bearing carried by said seat mount and receiving the other end of said drive shaft.

6. A recliner as defined in claim 1, in which said sun gear is journalled directly on said drive shaft and said worm gear is journalled directly on said sun gear.

* * * * *